No. 865,408. PATENTED SEPT. 10, 1907.
P. F. LOPEZ & J. P. ZAMORA.
WRAPPING MACHINE.
APPLICATION FILED DEC. 7, 1906.

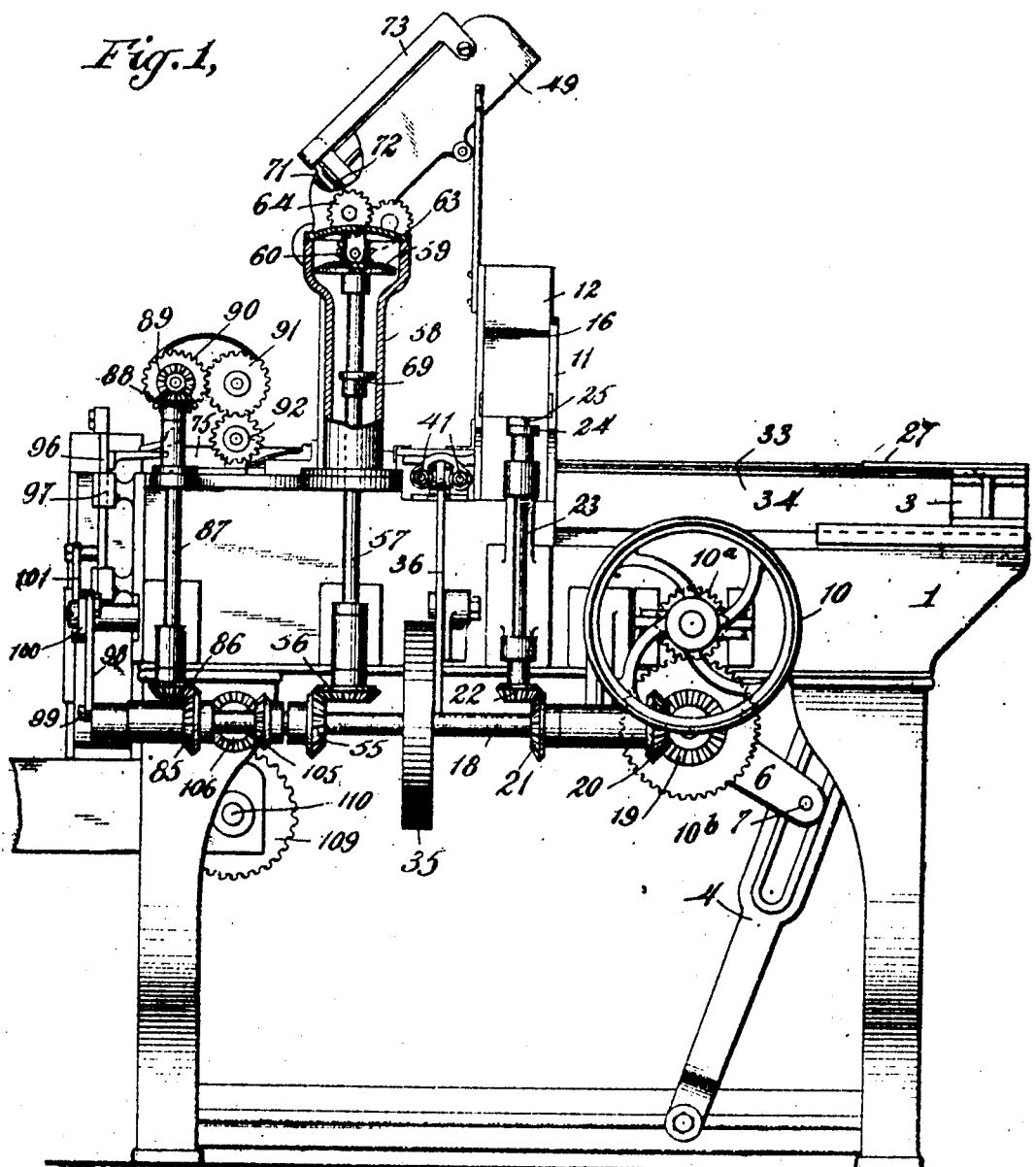

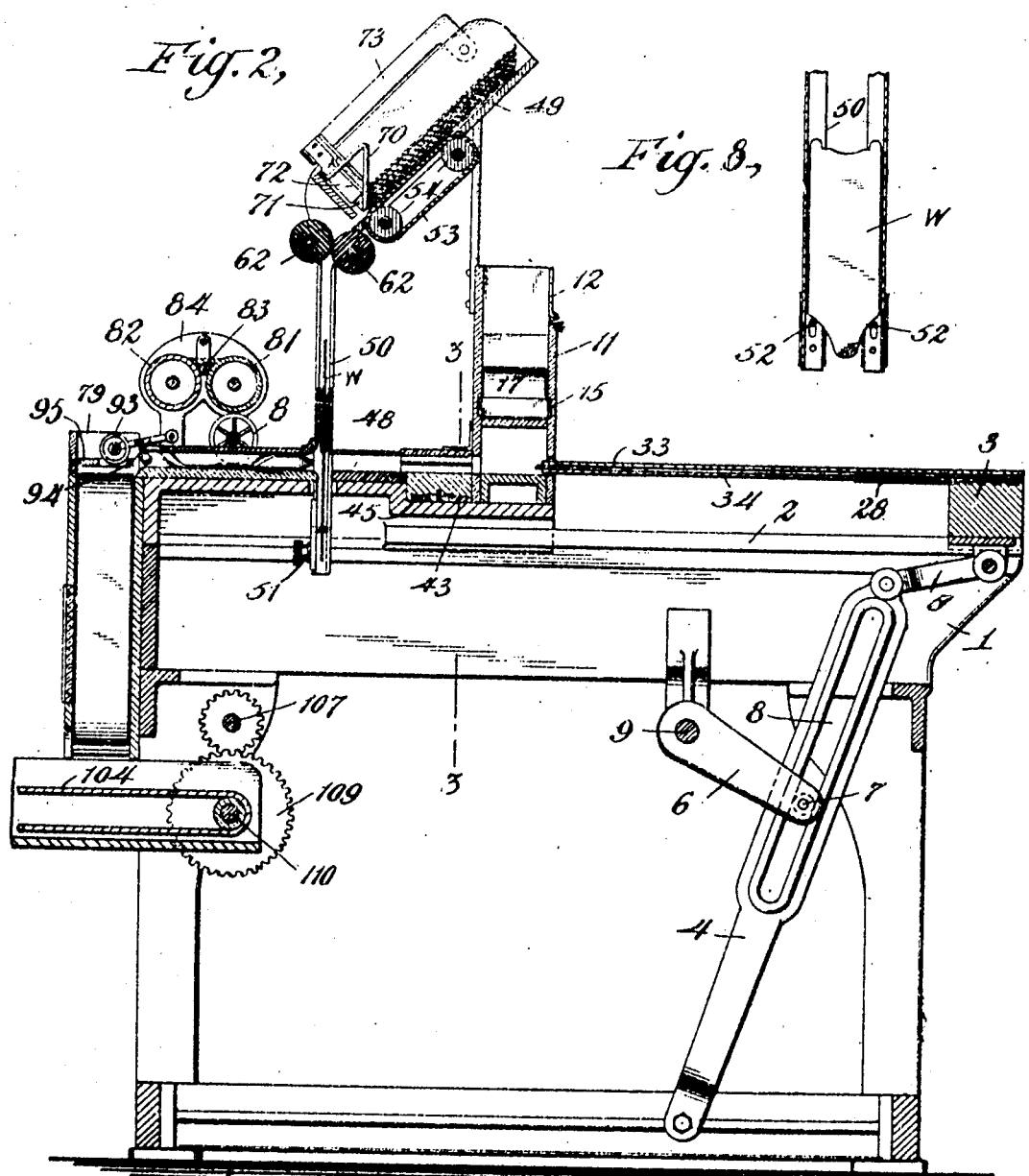

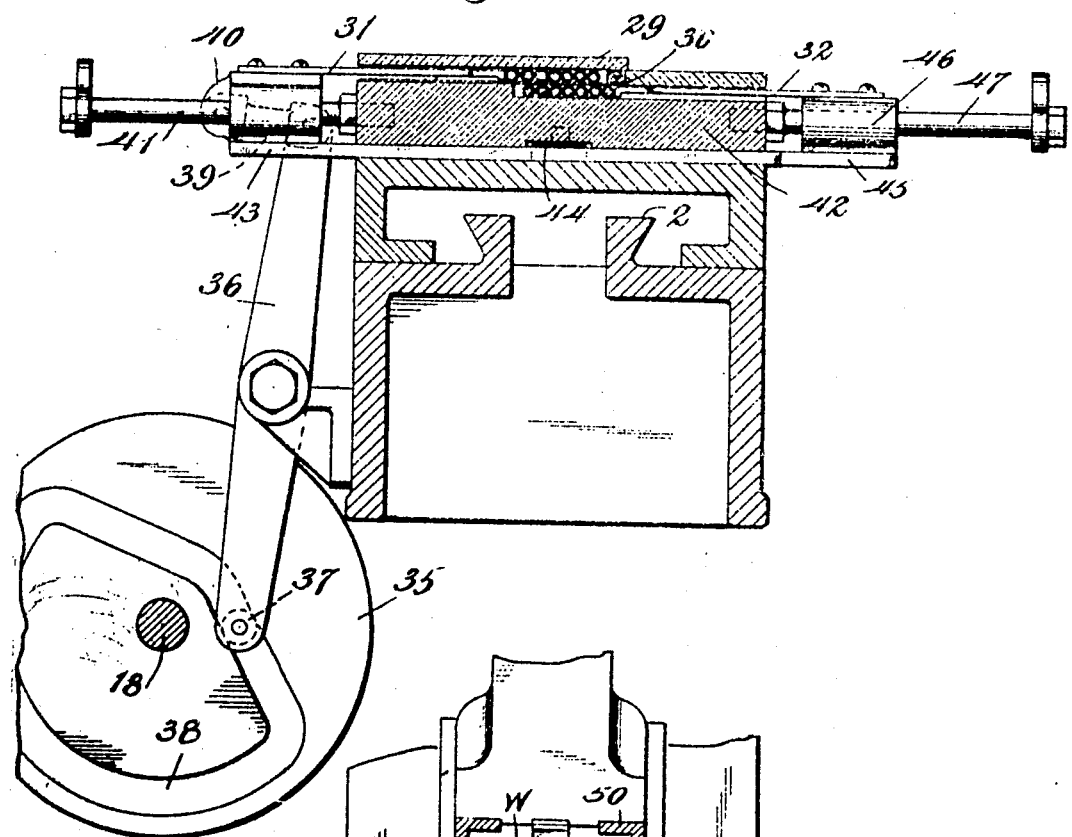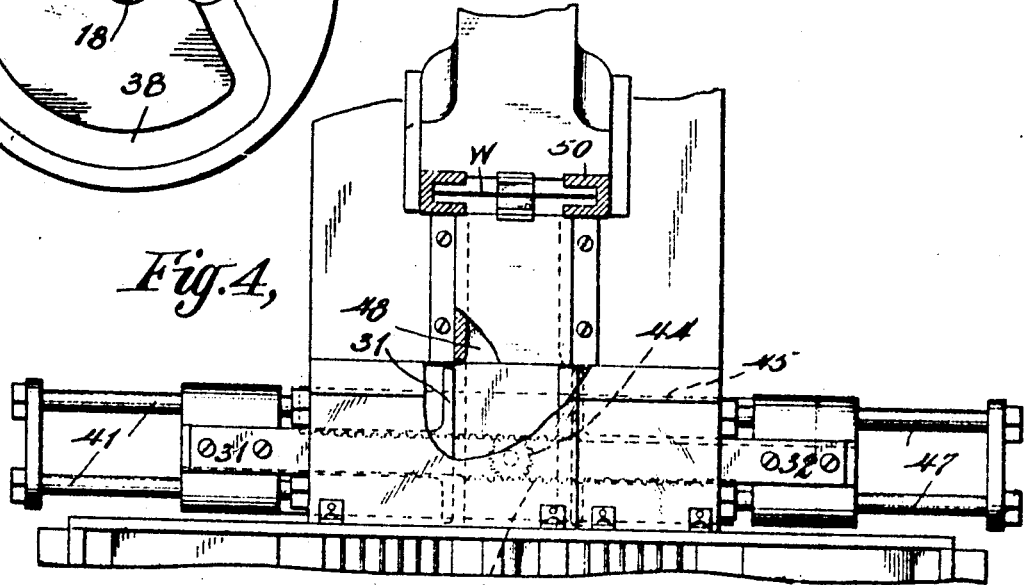

5 SHEETS—SHEET 4.

No. 865,408. PATENTED SEPT. 10, 1907.
P. F. LOPEZ & J. P. ZAMORA.
WRAPPING MACHINE.
APPLICATION FILED DEC. 7, 1906.
5 SHEETS—SHEET 5.
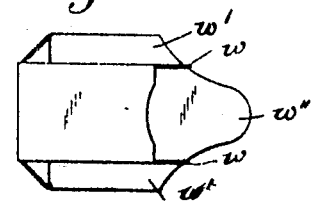
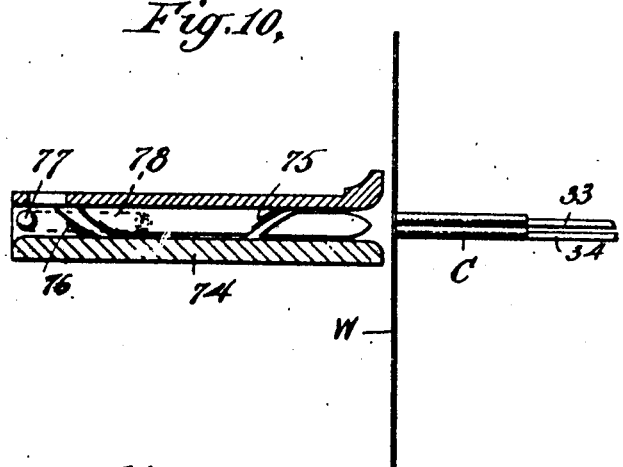
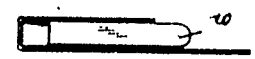
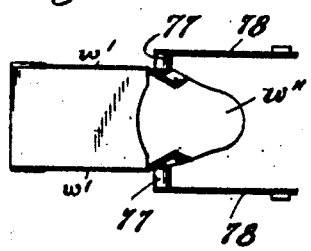
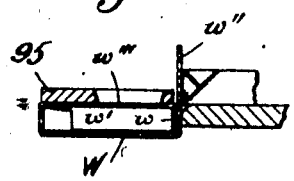
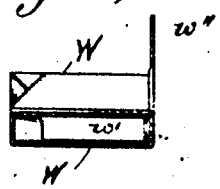
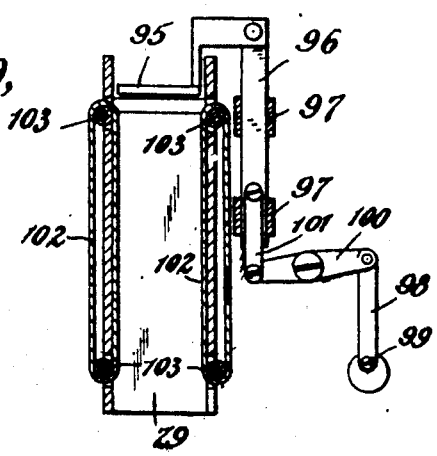
WITNESSES:
INVENTORS
Perfecto F. Lopez
Jose Pascual Zamora
BY
ATTORNEY

UNITED STATES PATENT OFFICE.

PERFECTO F. LOPEZ AND JOSE PASCUAL ZAMORA, OF HABANA, CUBA, ASSIGNORS TO INTERNATIONAL PACKING MACHINE COMPANY, A CORPORATION OF NEW YORK.

WRAPPING-MACHINE.

No. 865,408.  Specification of Letters Patent.  Patented Sept. 10, 1907.

Application filed December 7, 1906. Serial No. 346,814.

*To all whom it may concern:*

Be it known that we, PERFECTO F. LOPEZ and JOSE PASCUAL ZAMORA, citizens of the Republic of Cuba, and residents, respectively, of Consulado 114, altos, and Calle de Lagunas 85, in the city of Habana, Cuba, have invented certain new and useful Improvements in Wrapping-Machines, of which the following is a specification.

This invention relates to wrapping machines and especially to machines for counting out a predetermined number of small articles, such as cigarettes, bringing the articles together in a compact arrangement and inclosing the articles within a wrapper.

The principal features of the present invention are found in the mechanism for counting out a predetermined number of articles and for bringing the articles together in a compact arrangement, so that the wrapper may be successfully applied thereto, and a primary object of the invention is to provide means whereby a predetermined number of small and fragile articles, such as cigarettes, may be removed from a hopper at intervals and brought together in two layers without danger of injuring the articles in the process of removing them from the hopper and pressing them together before the wrapper is applied.

A further object of the invention is to provide counting and packing mechanism of simple design which will operate with certainty and will not be easily put out of order.

Further objects and advantages will hereinafter appear as the invention is disclosed in the following specification, reference being had to the accompanying drawings forming part thereof, in which I have illustrated a single embodiment of the invention.

Variations in the form, the proportions, and mode of assemblage of the elements may be made without departing from the spirit of the invention or sacrificing its advantages; and the scope of the invention is hereinafter defined in the appended claims.

Figure 5:
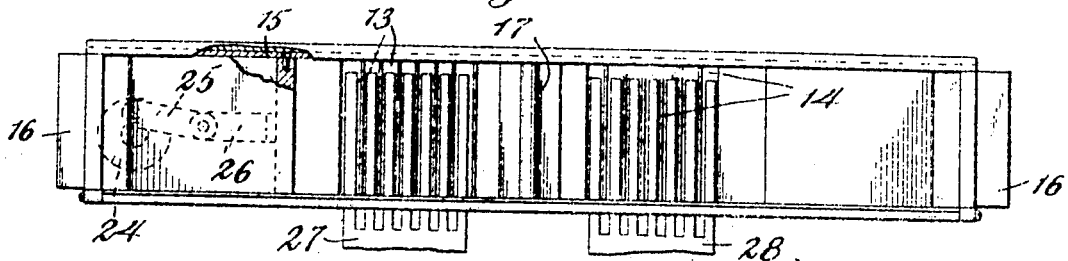
Figure 6:
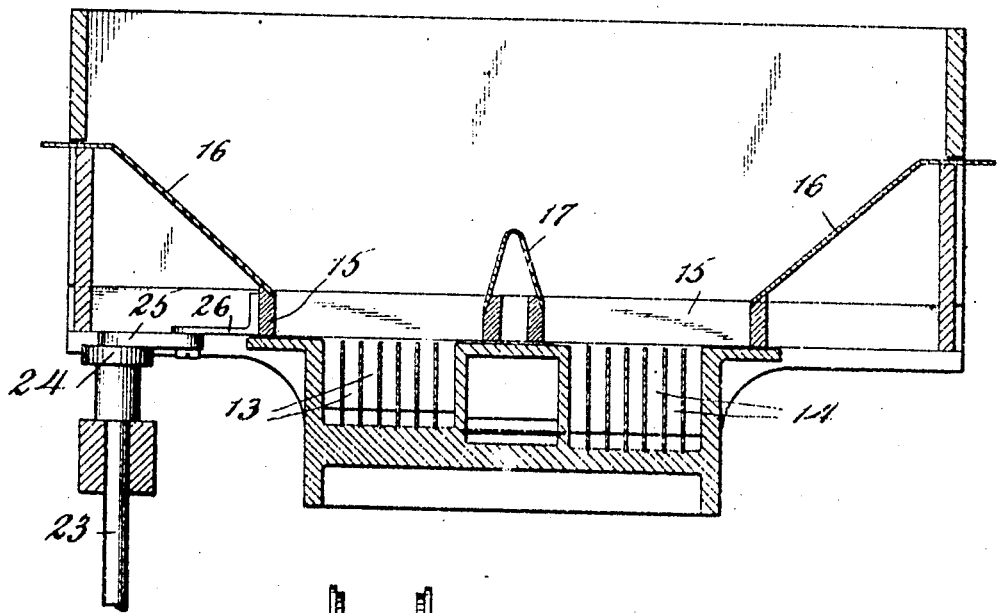
Figure 7:
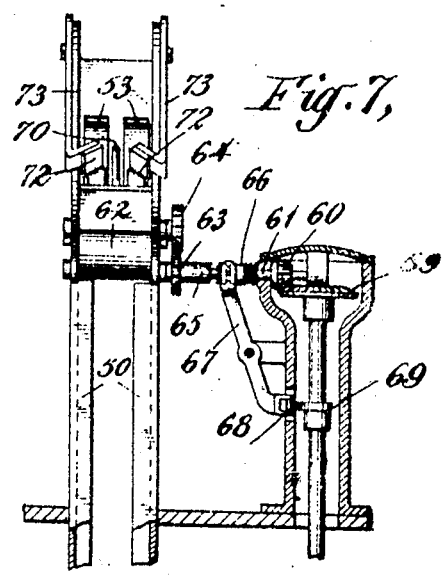

In the drawings: Figure 1 is a view in side elevation of the complete machine, parts being broken away to show the interior construction. Fig. 2 is a vertical section through the entire machine taken almost in a median line. Fig. 3 is a partial transverse vertical section on the line 3—3 of Fig. 2. Fig. 4 is a fragmentary plan view, with parts broken away or indicated in section, to show the compressing devices. Fig. 5 is a plan view of the hopper and receiving chambers, parts being broken away. Fig. 6 is a vertical section through the supply hopper and receiving chambers. Fig. 7 is a detail view of the wrapper feeding mechanism. Fig. 8 is a detail view of the wrapper positioning devices. Fig. 9 is a vertical section through the discharge chute, showing mechanism for discharging the finished packages. Fig. 10 is a detail view showing the wrapper and cigarettes in proper relative position immediately before the beginning of the wrapping operations and also showing some of the wrapper folding devices. Figs. 11 and 12 are views in plan and section respectively, of a partially completed package. Figs. 13, 14 and 15 are detail views illustrating the last three folding operations.

The machine comprises in its entirety several sets of mechanism which operate successively in the performance of the complete function of the machine. As each of these sets of mechanism performs a tolerably distinct sub-function, the several sets of mechanism will be briefly recited in connection with a general statement of the operations of the machine and then the machine will be described in detail, referring to the drawings by means of the reference characters marked thereon.

The articles to be wrapped, in this instance cigarettes, are placed in a hopper provided at the bottom with a plurality of receiving chambers. Agitating devices arranged in the hopper insure proper feeding to the receiving chambers, which are arranged in two groups, one on each side of a central chamber from which the cigarettes are excluded and which serve simply for the passage of a pair of thin plungers which serve to carry the cigarettes forward through the machine. The receiving chambers of one group are just enough deeper than those of the other group for the bottom layer of cigarettes in one group of chambers to lie in the same horizontal plane with the layer next to the bottom layer in the other group of chambers. Two sets of short plungers arranged for reciprocation in the two groups of receiving chambers force the bottom layer of cigarettes out of each group of receiving chambers at each reciprocation, the groups of receiving chambers and the coöperating plungers constituting the devices employed for counting out a predetermined number of cigarettes at each reciprocation of the plungers. The cigarettes counted out by means of the receiving chambers and plungers at each reciprocation of the plungers are next subjected to the action of the devices by which they are brought together in a compact arrangement prior to the application of a wrapper.

The devices consist of a pair of packers or plungers arranged for reciprocatory movement transversely of the machine and located immediately in front of the receiving chambers, one of the packers or plungers being adapted to operate upon the layer of cigarettes from one group of receiving chambers and the other packer or plunger being adapted to act upon the layer 10 from the other group of receiving chambers. These packers or plungers operate simultaneously and bring the cigarettes together in two superposed layers in which the cigarettes lie in close contact with each other.

The action of the packers brings the cigarettes into position in front of the plungers working longitudinally of the machine and by these plungers the two superposed layers of cigarettes are carried forward to the wrapping devices. The wrappers are arranged in a pile in a suitable holder and the wrapper feed devices remove the wrappers singly from the bottom of the pile, a wrapper being removed from the pile for each quantity of cigarettes advanced by the plungers. The wrapper feeding devices drop the wrapper upon suitable positioning devices by which the wrapper is supported directly in the path of the advancing cigarettes, so that the continued advance of the cigarettes forms the initial fold of the wrapper about the cigarettes and then the cigarettes with the wrapper partially folded around them are forced forward so that pasting devices may apply paste to suitable portions of the wrapper and the wrapper folding devices proper may complete the folding of the wrapper and seal the package. The completed packages are then discharged from the machine by intermittently operative devices which force the completed packages downward through the discharge chute of the machine.

Referring now to the drawings, and particularly to Figs. 1 and 2, 1 designates a stand or table of suitable construction upon which the moving parts of the machine are mounted. This table is slotted longitudinally at 2, to form a guide for a slide 3 which carries several sets of plungers. The mechanism for operating the slide 3 comprises a long slotted lever 4 pivoted at the bottom of the table or stand 1, a link 5 to connect the lever with the slide, and a crank 6, having its pin 7 working in the slot 8 of the lever and secured upon the main driving shaft 9 of the machine. Power may be applied to the main driving shaft in any suitable manner and a pulley 10 is provided to receive power which is transmitted to the main driving shaft through reducing gearing comprising the pinions 10ª and 10ᵇ.

The receiving hopper 11, is mounted about midway between the ends of the stand or table 1 and extends transversely thereof. The upper section 12 of the front wall of the hopper is pivoted to afford better access to the cigarettes in the hopper and at the bottom of the hopper are the two groups of receiving chambers 13 and 14. To insure the proper entry of the cigarettes into these receiving chambers an agitating device is provided. This consists of a frame 15 extending transversely of the machine, inclined wings 16 which converge downwardly, and a separator 17 in the middle of the frame 15 which has the form of an inverted wedge. Reciprocatory movement is imparted to the frame 15 by suitable mechanism and the reciprocations are short and rapid, thus keeping the cigarettes in the hopper from becoming jammed and insuring their proper delivery into the receiving chambers at the bottom of the hopper. The devices by which reciprocatory movement is imparted to the frame 15 are best seen in Figs. 1 and 6. Power is transmitted from the main driving shaft to a secondary shaft 18 by means of bevel gear wheels 19 and 20, and from the secondary shaft 18 power is transmitted through bevel gear wheels 21 and 22 a vertical shaft 23 provided at its upper end with a disk and wrist pin 24 from which movement is imparted to the frame 15 by a link 25 connected with a bracket 26 secured to one end of the frame.

The slide 3 carries two sets of short plungers 27 and 28, respectively, which are adapted to pass through the receiving chambers 13 and 14, respectively, as the slide 3 nears the end of its forward movement. These plungers force the bottom layer of cigarettes out of each group of chambers, the cigarettes from the chambers 13 advance into the packing chamber 29 and those from the chambers 14 advance into the packing chamber 30. As best shown in Fig. 3, the inner ends of the two packing chambers overlap, and packing plungers or packers 31 and 32 are arranged for reciprocatory movement in the packing chambers. By the action of these packers the cigarettes are brought together in two superposed layers at the inner ends of the packing chambers where they lie directly in the path of a pair of long plungers 33 and 34 carried by the slide 3.

The mechanism for imparting movement to the packers 31 and 32 is best shown in Figs. 3 and 4. A cam 35 on the shaft 18 operates a lever 36 which carries at its lower end a roller 37 which lies in a groove 38 on the face of the cam. At its upper end the lever 36 is connected by means of a link 39 with a slide 40 to which the packer 31 is secured. This slide 40 is supported by a pair of guide rods 41 projecting laterally from the block 42 in which the lower packing chamber 30 is formed. On the under side of the slide 40 is secured a rack bar 43 which extends through a guide-way formed in the block 42 and this rack bar engages with a small pinion 44 mounted midway between the ends of the block 42. The pinion 44 also meshes with a rack bar 45 which is secured to the under side of a slide 46 which is supported and guided by a pair of rods 47 arranged directly opposite the guide rods 41. This slide 46 carries the packer 32. Consequently, the movement of the slide 40 and the packer 31 under the action of the lever 36 is accompanied by a directly opposite movement of the slide 46 and the packer 32. The movements of the packers are, of course, so timed that the inward movements take place after the retraction of the plungers 33 and 34 from the packing chambers, and during the initial part of the advance of the plungers 33 and 34 the packers 31 and 32 remain stationary in their innermost positions, thus holding the cigarettes in the packing chambers 29 and 30 in proper position to be engaged by the plungers 33 and 34 and carried forward into the passage 48 which lies directly in front of the overlapping inner ends of the packing chambers.

It will be observed that the septum between the overlapping portions of the packing chambers is very thin, so that the arrangement of the cigarettes will not be altered in passing out of the packing chambers into the passage 48.

The passage 48 is intercepted by a guide-way for the wrappers as they descend from the wrapper feeding devices above. The wrappers W are laid in a pile on the inclined base of the holder 49 from which they are removed one by one by intermittently operative feeding devices and allowed to drop downward through the guide-way 50 until arrested by pins 52 projecting into the guide way 50, said pins being adjustable and connected with the nuts 51 by means of which they may be fastened in position.

The feeding devices by means of which the wrappers are moved one by one from the pile are shown in Figs. 1, 2 and 7. As shown in Fig. 2 and Fig. 7, a pair of belts are arranged beneath the pile of wrappers, the bottom of the wrapper holder being slotted to permit the belts to come in contact with the bottom wrapper in the pile. These belts 53 are supported on suitable rollers or pulleys 54 and are preferably made of rubber to insure sufficient friction between the belts and the wrappers to be withdrawn from the pile. Intermittent motion is imparted to the belts 53 and the action of the belts is so timed that a wrapper is always discharged into the guide way 50 and positioned upon the supporting pins 52 before the advance of a quantity of cigarettes C, as shown in Fig. 10. The power for operating the feeding devices is supplied from the shaft 18 from which it is transmitted through bevel pinions 55 and 56 to a vertical shaft 57, the upper portion of which is inclosed in a housing 58. Near the upper end of the shaft 57 is a bevel gear 59 which meshes with a small bevel pinion 60 on a horizontal shaft 61 which supports one of a pair of feed rollers 62. The shaft 61 bears a pinion 63 which meshes with another pinion 64 secured on the axis of the lower pulley 54 over which the belts 53 run. The pinion 63 is loose on the shaft 61, being secured to a sleeve 65 which is notched or toothed at one end to coöperate with a sliding sleeve 66 splined on the main shaft to form a clutch. The sliding sleeve 66 is moved to and fro by means of a lever 67 which engages a cam 69 on the shaft 57. The shaft 57 is rotated continuously by means of the pinions 55 and 56 and continuous rotation is imparted through the bevel gears 59 and 60 to the shaft 61 and the feed rollers 62; but the cam 69 keeps the clutch members 63 and 66 out of engagement except at the proper time to effect the discharge of a wrapper from the pile in the wrapper holder. Then the cam 69 allows the clutch members to engage and impart movement to the lower pulley 54, from which it is transmitted to the belts 53 which act upon the bottom wrapper in the pile and cause it to pass forward and downward to the feed roller 62 by which it is carried to the guide way 50. The removal of more than one wrapper from the pile at each operation of the feeding belts is prevented by means of suitable stops. These stops comprise the bent gage rod 70 and a pair of rubber fingers 71 carried by inclined supporting members 72 attached to the pivoted arms 73. The rubber fingers are so positioned that they rest upon the upper surface of the wrapper drawn from the bottom of the pile by the belts, and if several wrappers adhere together and are carried forward by the belts, the frictional engagement of the rubber fingers with the overlying wrappers will separate them from the bottom wrapper which is carried forward on account of the greater friction developed between it and the feed belts.

The series of operations by which the wrapper is folded around the cigarettes so as to form a complete package is illustrated in Figs. 10 to 15 inclusive and by reference to Figs. 1 and 2 the application of paste or other adhesive to suitable portions of the wrapper so as to effect the sealing of the wrapper will be clearly understood. The initial fold of the wrapper about the cigarettes is effected by the pressure of the ends of the cigarettes against the wrapper as it is held on the supporting pins 52 near the bottom of the vertical guide way. The continued advance of the cigarettes under the action of the plungers 33 and 34 carries the wrapper forward into the folding box 74, the top and bottom of which bend the wrapper as the cigarettes pass into the box so as to bring the wrapper in contact with the cigarettes both above and below. After the cigarettes and wrapper enter the folding box the first or downward side folds are made by the inclined folders 75, thus bringing the package into the condition shown in Figs. 11 and 12. Further progress of the wrapper and cigarettes through the folding box effects the second or upward side folds through the agency of the upwardly inclined folders 76. The last folding action that takes place in the folding box is the inward bending of the flaps $w$, which is brought about by small knobs 77 carried by spring fingers 78 and extending through the side of the folding box. After passing through the folding box the partially completed package is left in the upper portion of the discharge chute 79 through which it passes to receiving devices below. The paste or other adhesive for securing the parts of the package is applied to the side portions $w'$ of the wrapper as it passes through the folding box and the means provided for applying the paste or other adhesive consists of a pair of suitably mounted wheels 80 to which the paste is supplied from a roller 81. The roller 81 and a smaller roller 82, together with a doctor 83 arranged between the two rollers, serve as a receptacle for the adhesive. Both the rollers and the doctor are supported in a suitable frame 84 above the folding box and the two rollers are rotated continuously, power being supplied from the shaft 18 through bevel pinions 85 and 86 to a vertical shaft 87 from which motion is transmitted through bevel pinions 88 and 89 to the roller 82. Intermeshing gears 90 and 91 serve to transmit motion to the roller 81 and an additional pinion 92 on the shaft carrying the paste wheels 80 transmits motion from the pinion 91 to the paste wheels. After the partially completed package is forced from the folding box into the discharge chute 79 paste is applied on the upper surface of the package at $w'''$ to secure the end flap in place. The means employed for applying this paste is a roller 93 carried by a swinging arm 94. This roller is brought into contact with the paste roller 82 by means of a reciprocating follower 95 which serves the double function of raising the roller 93 into contact with the paste roller 82 on its upward stroke and depressing the packages in the discharge chute on its downward stroke. As shown in Fig. 2, the follower 95 has an opening through which the roller 93 projects sufficiently to come in contact with the package immediately beneath the follower 95 toward the end of its downward movement.

The condition of the package at the time it passes into the discharge chute is illustrated in Fig. 13 and the folding and sealing of the flap $w''$ to complete the package is effected in the discharge chute. The downward movement of the follower 95 not only permits the roller 93 to come in contact with the package and apply a paste at $w'''$, but by forcing the package downward below the level of the folding box, as shown in Fig. 14, effects the first bending of the end flap which is shown in the same figure. The final bending and sealing of the end flap is effected after the rise of the follower 95 by the next package which is forced from the folding box into the discharge chute, as shown in Fig. 15.

The passage of the packages through the discharge chute is slow and the discharge chute is so constructed that a considerable amount of pressure is required to force the packages through it. The object of this construction is to insure the setting of the paste or adhesive before the packages are discharged from the machine upon the receiving devices below. The force required for carrying the packages downward through the discharge chute is supplied by the follower 95 which is attached to a reciprocating bar 96 working in guides 97 adjacent to the chute. Movement is imparted to this bar from the shaft 18 by means of a link 98 attached to an eccentrically mounted screw 99 in the end of the shaft, a lever 100 and a link 101 connecting the lever with the bar 96. A pair of oppositely arranged belts are mounted on rollers 103 placed in the sides of the discharge chute. These belts prevent the rubbing of the packages against the sides of the discharge chute and, being preferably of rubber, yield sufficiently to permit the passage of packages of slightly different size through the discharge chute without distortion.

As the packages are discharged one by one from the chute 79, they fall upon a receiving belt 104 arranged horizontally beneath the discharge chute and actuated from the shaft 18 by means of bevel pinions 105 and 106, which transmit motion to the transverse shaft 107, the spur pinion 108 carried by the shaft 107 and the intermeshing spur gear 109 on the shaft 110 carrying one end pulley or roller upon which the belt 104 is supported. The packages are carried by the receiving belt 104 to any desired point of delivery.

From the foregoing description taken with the accompanying drawing, it will be observed that the machine as a whole is very simple and the parts are so constructed and arranged that the machine is not liable to breakage or injury in ordinary use. It will also be observed that the articles to be wrapped are never subjected to treatment which is apt to break or distort them in any way. Each article is removed from one of the receiving chambers beneath the supply hopper independently of every other article and there is no rubbing of the articles against each other during the action of the plungers by which they are forced out of the receiving chambers. After the articles at the bottoms of the receiving chambers are removed, each group of articles so removed is subjected to lateral pressure by which all the articles in the group are brought in close contact preparatory to the action of the plungers by which the articles are presented to the wrapper. Each group of articles forms a layer separate from and independent of the other group and even when both layers are forced out of the packing chambers simultaneously by the plungers and brought together in superposed layers, there is no rubbing of one layer of articles over the other. At the time that the plungers are acting upon two layers to carry them forward for wrapping, they are held against lateral movement so that no displacement can take place during their advance.

A special feature of the machine is its adaptability for use with thin and highly flexible wrappers, and the packages formed by the machine using these wrappers are of uniform size and shape and present the appearance of boxes formed of much heavier material.

The invention having thus been described, what is claimed as new and desired to secure by Letters Patent is:

1. In a machine of the character specified, the combination with a hopper, of a plurality of receiving chambers of suitable width to admit articles singly, said chambers being in a plurality of groups and the chambers of each group having their bottoms in a plane different from the plane of the bottoms of the chambers in any other group, means for removing from each group of chambers the series of articles at the bottom thereof, and means for bringing the articles so removed together in a plurality of superposed layers.

2. In a machine of the character specified, the combination with a hopper, of a plurality of receiving chambers of suitable width to receive articles singly, said chambers being in a plurality of groups, means for removing the articles at the bottoms of all of said chambers, and means for assembling said articles in a plurality of superposed layers.

3. In a machine of the character specified, the combination with a hopper, of a plurality of receiving chambers of suitable width to admit articles singly, said chambers being arranged in groups and the chambers in each group having their bottoms in a plane different from the plane of the bottoms of the chambers in any other group, means for removing the articles at the bottoms of all the chambers and means for bringing the articles so removed together in a plurality of superposed layers and compressing the articles in said layers laterally.

4. In a machine of the character specified, the combination with a hopper, of a plurality of receiving chambers of suitable width to admit articles singly, said receiving chambers being in groups, means for removing the articles at the bottoms of the chambers in each group separately, and means for bringing the articles removed from the several groups of chambers together in a plurality of superposed layers, the number of layers corresponding to the number of groups of chambers.

5. In a machine of the character specified, the combination with a hopper, of a plurality of receiving chambers beneath the hopper, said chambers being arranged in groups, a packing chamber in front of each group of receiving chambers, means for forcing the articles at the bottoms of said receiving chambers into the packing chambers, and means for compressing the articles in the packing chambers and for bringing them together in a plurality of superposed layers.

6. In a machine of the character specified, the combination with a hopper, of a plurality of receiving chambers arranged in groups and adapted to receive articles from the hopper, a packing chamber in front of each group of receiving chambers, a packing member working in each packing chamber, and means for simultaneously operating said packing members to compress the articles in the packing chambers and bring them together in a plurality of superposed layers.

7. In a machine of the character specified, the combination with a hopper, of a plurality of receiving chambers arranged beneath the hopper in groups, packing chambers in front of said receiving chambers, means for removing articles from said receiving chambers to said packing chambers, packing members working in said packing chambers to bring said articles together in a plurality of superposed layers and compress the same laterally and means for removing articles from the packing chambers after each operation of the packing members and before the transfer of articles from the receiving chambers to the packing chambers.

8. In a machine of the character specified, the combination with a hopper, of a plurality of receiving chambers having their bottoms arranged in different horizontal planes packing chambers in front of said receiving chambers, fingers working in said receiving chambers to force the lowermost layers of articles therefrom and into the packing chambers, and a plunger extending forward beyond the fingers and movable therewith to remove articles from the packing chamber before the entry of the fingers into the receiving chambers.

9. In a machine of the character specified, the combination with a hopper and a plurality of receiving chambers adapted to receive articles from the hopper, said receiving chambers being arranged in two groups spaced apart, fingers working in said receiving chambers to force articles forward therefrom, a plunger working between said groups of receiving chambers and extending forward beyond the fingers, and means in front of said receiving chambers for forcing the articles discharged therefrom into the path of the plungers.

10. In a machine of the character specified, the combination with a hopper and a plurality of receiving chambers adapted to receive articles therefrom, said receiving chambers being arranged in groups which are spaced apart, a packing chamber in front of each group of receiving chambers, the inner ends of said packing chambers being superposed, plungers working between said groups of receiving chambers and passing through the overlapping portions of said packing chambers, means for forcing articles forward from the bottoms of said receiving chambers and into the packing chambers, and packers working in said packing chambers to force said articles laterally into the superposed portions of said chambers and into the path of the plungers.

11. In a machine of the character specified, the combination of a hopper and a plurality of receiving chambers, adapted to receive articles from the hopper, of packing chambers having packers working transversely thereof means for forcing articles from the bottoms of said receiving chambers into said packing chambers, plungers working longitudinally of said packing chambers, and operating devices for said packers, whereby said packers are held in operative position during the forward movement of the plungers through the packing chambers.

12. In a machine of the character specified, the combination with a hopper, of a plurality of receiving chambers beneath the hopper of such width as to admit the articles singly, said receiving chambers being arranged in groups having their bottoms in different horizontal planes the hopper being longer than the entire series of receiving chambers, and a reciprocatory box or frame arranged between the hopper and the receiving chambers, said box or frame being open and having a limited movement, such that the walls of the box never overlie any of the receiving chambers.

13. In a machine of the character specified, the combination with a hopper having movable inclined walls which converge downwardly towards the bottom of the hopper, of a reciprocatory frame upon which said inclined walls are supported, and a plurality of receiving chambers formed into groups having their bottoms in different horizontal planes arranged beneath said frame and having a total length less than that of the frame.

14. In a machine of the character specified, the combination with a hopper having fixed vertical walls and movable inclined walls, said inclined walls converging downwardly toward the bottom of the hopper, of a reciprocatory frame upon which said inclined walls are supported, and a plurality of receiving chambers arranged in separate groups below said frame and having a total length less than that of the frame.

15. In a machine of the character specified, the combination with a hopper, of a plurality of receiving chambers beneath the hopper, said receiving chambers being arranged in groups and having a plate extending between the tops of the adjacent chambers in the said groups, and a reciprocatory frame or box arranged between said hopper and said receiving chambers and having an arched member overlying said plate, the movement of said arch being such that it never projects beyond the edge of the plate.

16. In a machine of the character specified, the combination with mechanism for folding a wrapper about one or more articles and leaving a flap of the wrapper unsealed, of a discharge chute into which the partially formed package is delivered from the folding mechanism, means for applying paste to the exterior of the wrapper in position to secure an unsealed flap, and means for forcing the partially completed package outward in the discharge chute to a sufficient distance to partially fold the unsealed flap and leave the extremity thereof in the path of the next partially completed package to enter the discharge chute.

17. In a machine of the character specified, the combination with article-presenting mechanism and means for supplying a wrapper in the path of the articles presented, of a folding box through which the articles and wrapper are forced to fold the wrapper around the articles, said folding box being provided with spring fingers extending longitudinally thereof and carrying knobs or bosses directed towards each other and which engage the corner flaps of the wrapper to partially fold them as the wrapper and the articles inclosed thereby pass through the folding box.

PERFECTO F. LOPEZ.
JOSE PASCUAL ZAMORA.

Witnesses:
VICTOR NORMAND,
A. ROGERS.